(12) United States Patent
Aschauer et al.

(10) Patent No.: US 11,917,081 B2
(45) Date of Patent: Feb. 27, 2024

(54) ISSUING DEVICE AND METHOD FOR ISSUING AND REQUESTING DEVICE AND METHOD FOR REQUESTING A DIGITAL CERTIFICATE

(71) Applicant: Siemens Aktiengesellschaft, Munich (DE)

(72) Inventors: Hans Aschauer, Munich (DE); Fabrizio De Santis, Munich (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 392 days.

(21) Appl. No.: 17/286,630

(22) PCT Filed: Oct. 7, 2019

(86) PCT No.: PCT/EP2019/077090
§ 371 (c)(1),
(2) Date: Apr. 19, 2021

(87) PCT Pub. No.: WO2020/083629
PCT Pub. Date: Apr. 30, 2020

(65) Prior Publication Data
US 2021/0351940 A1 Nov. 11, 2021

(30) Foreign Application Priority Data
Oct. 23, 2018 (EP) .................................... 18201907

(51) Int. Cl.
*H04L 9/32* (2006.01)
*G06F 16/27* (2019.01)
(Continued)

(52) U.S. Cl.
CPC .......... *H04L 9/3268* (2013.01); *G06F 16/27* (2019.01); *H04L 9/30* (2013.01); *H04L 9/3239* (2013.01); *H04L 9/3271* (2013.01); *H04L 9/50* (2022.05)

(58) Field of Classification Search
CPC ....... H04L 9/3268; H04L 9/30; H04L 9/3239; H04L 9/3271; H04L 9/50; G06F 16/27
See application file for complete search history.

(56) References Cited

U.S. PATENT DOCUMENTS

2005/0154877 A1* 7/2005 Trench ............... G06Q 20/3829
   713/156
2009/0048979 A1* 2/2009 Al-Herz ............... H04L 9/3213
   705/67

FOREIGN PATENT DOCUMENTS

CN 108235805 A 6/2018
GB 2548802 A 10/2017

OTHER PUBLICATIONS

Anderson Ross: "Security Engineering. A Guide to Building Dependable Distributed Systems"; Wiley, Jan. 2001. pp. 1-600.
(Continued)

*Primary Examiner* — Khoi V Le
(74) *Attorney, Agent, or Firm* — Lempia Summerfield Katz LLC

(57) ABSTRACT

An issuing device is configured to: respond to a challenge request by transmitting a challenge; and respond to a certification request including a public key and ownership information thereof by issuing a digital certificate certifying the ownership information. The ownership information includes counterparty identity information relating to a ledger of a distributed database. The digital certificate is issued if it is successfully verified that a valid response to the challenge has been posted to the ledger of the distributed database and is associated therein with the counterparty identity informa-
(Continued)

tion of the certification request. The digital certificate facilitates proofing that an owner of a public key is a given counterparty to a blockchain ledger. Also, a corresponding requesting device and corresponding methods and computer program products for issuing and requesting a digital certificate are disclosed.

19 Claims, 8 Drawing Sheets

(51) Int. Cl.
  H04L 9/30 (2006.01)
  H04L 9/00 (2022.01)

(56) References Cited

OTHER PUBLICATIONS

Andreas M. Antonopoulos, Gavin Wood "The Ethereum Book Project/Mastering Ethereum" https://github.com/ethereumbook/ethereumbook, Stand 5.10.2017; pp. 1-362.
Antonopoulos Andraes M: "Mastering Bitcoin—Unlocking Digital Cryptocurrencies", O'Reilly Media, Beijing Cambridge Farnham Koln; Sebastopol Tokyo, XP055306939, ISBN: 978-1-4493-7404-4. 2014. pp. 1-282.
Baird Leemon: "Overview of Swirlds Hashgraph", Swirlds; 2016. pp. 1-4.
Baird, Leemon. "The swirlds hashgraph consensus algorithm: Fair, fast, byzantine fault tolerance." Swirlds Tech Reports SWIRLDS-TR-2016-01, Tech. Rep (2016). pp. 1-28.
Blockchainhub: "Blockchain Oracles", https://blockchainhub.net/blockchain-oracles/; 2018;. pp. 1-5.
Diedrich, Henning "Ethereum: Blockchains, Digital Assets, Smart Contracts, Decentralized Autonomous Organizations" CreateSpace Independent Publishing Platform, Sep. 8, 2016 // ISBN-10: 1523930470 // ISBN-13: 978-1523930470; pp. 1-3.
Menezes, A. J., P. C. V. Oorschot, and Scott A. Vanstone. "Key management techniques." Handbook of Applied Cryptography—URL:http://www.cacr.math.uwaterloo.ca/hac/, Chapter 13.2.4 (1996): 543-590.
Needham, Roger M., and Michael D. Schroeder. "Using encryption for authentication in large networks of computers." Communications of the ACM 21.12 (1978): 993-999.
PCT International Search Report and Written Opinion of International Searching Authority dated Dec. 6, 2019 corresponding to PCT International Application No. PCT/EP2019/077090.

* cited by examiner

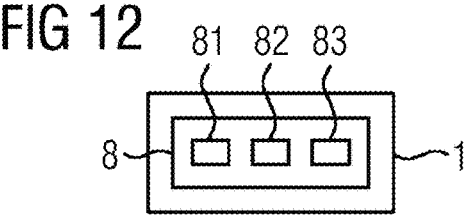
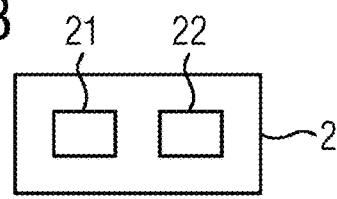
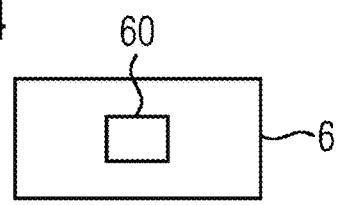
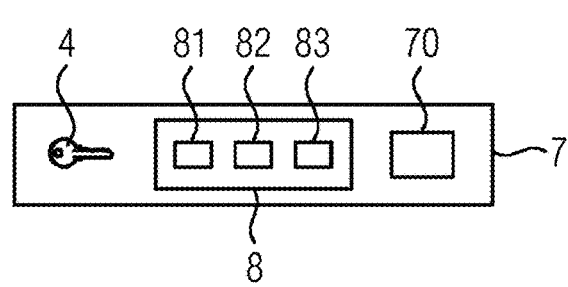
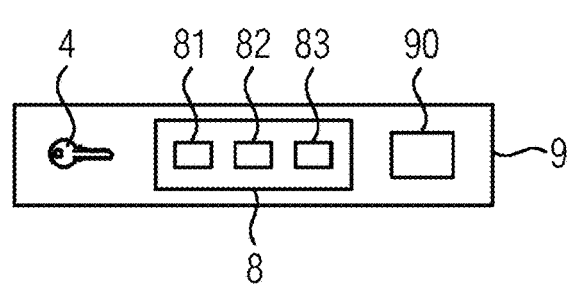

ISSUING DEVICE AND METHOD FOR ISSUING AND REQUESTING DEVICE AND METHOD FOR REQUESTING A DIGITAL CERTIFICATE

The present patent document is a § 371 nationalization of PCT Application Serial No. PCT/EP2019/077090, filed Oct. 7, 2019, designating the United States, which is hereby incorporated by reference, and this patent document also claims the benefit of European Patent Application No. 18201907.5, filed Oct. 23, 2018, which is also hereby incorporated by reference.

TECHNICAL FIELD

The present disclosure relates to the field of information technology security and, more particular, to an issuing device and a method for issuing a digital certificate and to a requesting device and a method for requesting a digital certificate.

BACKGROUND

A digital certificate, such as a X.509 certificate, enables a trusted issuer to cryptographically certify correspondence between a public key of a cryptographic key pair and identity information of an owner of the cryptographic key pair. The owner may be a web server, and the identity information may be a domain name thereof. A client device that is presented by the owner with the digital certificate may trust in the identity of the owner when using the public key of the cryptographic key pair to verify a digital signature created by the owner and/or encrypt sensitive information to be decrypted by the owner using the private key of the cryptographic key pair.

Methods for automatically issuing a digital certificate are known which require the owner to provide the trusted issuer with a proof of a certain property or role of the owner. These known methods include Simple Certificate Enrollment Protocol (SCEP), Certificate Management Protocol (CMP), Certificate Management over CMS (CMC), Enrollment over Secure Transport (EST), and Automatic Certificate Management (ACME).

A distributed database system based on blockchain technology may be used to host a ledger that includes a sequence of transactions cryptographically linked to form a transparent, immutable, and retraceable chain of transactions. Herein, a device acting as a counterparty, such as an originator or a recipient, of a transaction of the ledger is indicated, in the ledger, by counterparty identity information derived from a cryptographic key pair owned by the device. The counterparty identity identification allows to establish that a counterparty of a first transaction and a counterparty of a second transaction are identical but does not reveal the real-world identity of the device that acts as the counterparty.

Such a blockchain-based distributed database system may be used as an information technology platform for an industrial automation system, wherein a transaction may represent a sensor reading, an actor setpoint values, a smart contract implementing control logic of the industrial automation system, and the like.

There may arise a situation in which a device, (such as a web server, a sensor node, or the like), is required to proof that it is indeed the device acting as a counterparty indicated in the ledger by a given counterparty identity information.

SUMMARY AND DESCRIPTION

The scope of the present disclosure is defined solely by the appended claims and is not affected to any degree by the statements within this summary. The present embodiments may obviate one or more of the drawbacks or limitations in the related art.

It is one object of the present disclosure to provide means for simplifying a proof that a device is a given counterparty to a ledger of a distributed database, such as a blockchain.

According to a first aspect, an issuing device for issuing a digital certificate includes a first entity configured to respond to a challenge request received from a requesting device by transmitting challenge information including a cryptographic challenge to the requesting device; and a second entity configured to respond to a certification request received from the requesting device, the certification request including a public key and ownership information of the public key, by issuing a digital certificate certifying the ownership information of the public key. Herein, the ownership information includes counterparty identity information relating to a ledger of a distributed database. The second entity is further configured to issue the digital certificate under the condition that the second entity successfully verifies that: a cryptographic response to the cryptographic challenge has been posted to the ledger of the distributed database; that the cryptographic response is associated, in the ledger, with the counterparty identity information included in the ownership information of the certification request; and that the cryptographic response constitutes a valid proof of ownership of the public key.

The "proof of ownership of the public key" may be a "proof of ownership of a private key corresponding to the public key".

In particular, the public key and the corresponding private key may constitute an asymmetric cryptographic key pair.

The proposed issuing device may advantageously automatedly issue a digital certificate that is tied to counterparty identity information relating to a distributed database. The issued digital certificate may advantageously be used as a cryptographic proof that the requesting device is the counterparty to the ledger of the distributed database that is identified by the counterparty identity information included in the issued digital certificate.

The expression "a number of" shall mean a number of one or more.

The expressions "public key" and "private key" may refer to portions of an asymmetric cryptographic key pair. The asymmetric cryptographic key pair may relate to an asymmetric cryptographic key architecture. That is, a public key and its corresponding private key may form an asymmetric cryptographic key pair, for brevity also referred to as "cryptographic key pair". Examples of an asymmetric cryptographic key architecture include architectures used in technologies such as PGP, S/MIME, SSL/TLS, and the like.

Specifically, a public key may enable any third-party device that is provided with the public key to encrypt information such that only the owner of the corresponding private key is able to decrypt the encrypted information. Conversely, a private key may enable the owner of the private key to create a digital signature of any sequence of data. The digital signature may be used by any third-party device that is provided with the public key corresponding to the private key to verify that the signed sequence of data has indeed been signed by the owner of the private key.

The expressions "own a public key", "owner of a public key", and "ownership of a public key" may refer to owning, an owner, an ownership of a corresponding private key. The owner (the entity that owns) may be a device having stored thereon a cryptographic key pair constituted by the public key and a corresponding private key and/or may have access to the cryptographic key pair via communications over a communication line or the like. At least an access to the private key of the cryptographic key pair may be restricted, such as by a security policy, such that the owning entity may access the private key and an unauthorized third-party entity may not have access to the private key.

The expression "challenge request" may refer to a data structure transmitted by the requesting device to the issuing device. The challenge request may serve as a trigger that causes the first entity to generate and transmit the challenge information, and may optionally include further information, such as the ownership information.

The "cryptographic challenge" may include a data structure including data to be used by the challenge device when creating the "cryptographic response".

Conversely, the "cryptographic response" may include a data structure to be created by the requesting device based on the cryptographic challenge and using the private key corresponding to the public key. The cryptographic response may thus be regarded as a proof that the requesting device indeed owns the private key.

For example, the cryptographic challenge may be an unpredictable, difficult-to-predict, or randomly generated value, and/or may be a nonce (number used once, value used only nonce). The cryptographic response may be a digital signature of the cryptographic challenge created using the private key.

The expression "certification request" may refer to a data structure, such as a certificate signing request or CSR, that includes the public key, the ownership information of the public key to be certified, and a digital signature created using the private key corresponding to the public key.

The certification request and/or the ownership information may further include an indication of the ledger of the distributed database where the cryptographic response has been posted.

The expression "ownership information of a public key", or "ownership information", may be used for brevity to describe "ownership information of an owner of the private key corresponding to a public key", that is, to describe information that identifies the owner of the private key corresponding to the public key. Likewise, the expression "owner of a public key" may be used for brevity to describe an owner of the private key corresponding to the public key.

The "digital certificate" certifying the ownership information of the public key of the requesting device may include a cryptographic data structure that includes: the public key, the ownership information of the public key, and a digital signature created using a private key of the issuing device.

The digital certificate may be an X.509 certificate.

Thereby, any third-party device that is in a trust relationship with the issuing device, when provided by the requesting device with the digital certificate, may encrypt data to be transmitted to the requesting device using the public key included in the digital certificate and/or may verify a digital signature transmitted from the requesting device using the public key included in the digital signature Herein, the third-party device may advantageously trust that the requesting device is the device that is identified by the ownership information included in the digital certificate.

Herein, "being in a trust relationship with the issuing device" may mean that the third-party device that is in the trust relationship with the issuing device may be configured to trust any cryptographic data structure created using the private key of the issuing device, such as the digital certificate, or the digital signature included therein. To this end, a public key corresponding to the private key of the issuing device may be stored at the third-party device and may be flagged as belonging to a cryptographic key pair that is to be trusted. Herein, the third-party device may use the public key of the issuing device to verify whether the cryptographic data structure has been created using the private key of the issuing device that corresponds to the public key.

The expression "issuing a digital certificate" may include creating the digital certificate and may optionally also include transmitting the digital certificate to the requesting device and/or posting the digital certificate to the ledger of the distributed database.

The expression "distributed database" may refer to a transactional database. The transactional database may include at least one ledger. The ledger may be described as a sequence of transactions that are cryptographically chained.

A transaction may refer to a record or data structure including data that describes a transformation from a state represented by the ledger prior to the transaction being posted to a state represented by the ledger after the transaction has been posted.

Data included in a respective transaction may include or refer to, for example, a sensor reading, an actuator set point, a smart contract including control code of an industrial automation system, a transfer of cryptocurrency, and the like.

The transactions being cryptographically chained may include the transactions being grouped into blocks, wherein the blocks are cryptographically chained. The cryptographical chaining may be implemented by a respective block including a cryptographic checksum, such as a hash value, of a preceding block of the chain. A respective block may further include a cryptographic proof, such as a proof-of-work, proof-of-stake, or the like, which may have the effect that an amount of computational resources need to be used or allocated so as to be able to create the block and may make it difficult or impossible to alter the block after it has been created. Through cryptographically chaining a series of blocks each including a cryptographic proof, the chain of transactions may be protected against tampering with the transactions stored therein.

Herein, "distributed" may refer to the database being hosted by a plurality of nodes. In particular, an instance of the ledger may be stored on each of the plurality of nodes. Each of the plurality of nodes may be configured to implement a consensus protocol, which may cause the plurality of nodes to agree on a consensus version of the ledger. The expression "ledger" may be used herein to refer to the consensus version of the ledger.

In order to post a transaction to the ledger, the transaction may be transmitted to at least one of the plurality of nodes. The plurality of nodes may implement direct or peer-to-peer communication to disseminate the transaction throughout the plurality of nodes. Each of the plurality of nodes may use the consensus protocol to decide whether and which of a number of transactions received through the direct or peer-to-peer communication is appended to the instance of the ledger stored on the respective of the plurality of the nodes. Herein, the consensus protocol may be configured such that, over time, the plurality of nodes agrees on a same consensus version of the ledger. To this end, a behavior of a node that conforms to the consensus protocol may be rewarded, and a behavior of a node that does not conform to the consensus protocol, such as the posting of invalid transactions, tampering with previously posted valid transactions and the like, may be penalized. Specifically, the consensus protocol may provide that an instance of the ledger that contains invalid transactions and/or transactions that have been tampered with will not become part of the consensus version of the ledger as long as a majority of the plurality of nodes performed in accordance with the consensus protocol. In other words, even if some of the plurality of nodes are compromised, the distributed database (e.g., the consensus version of the ledger), may advantageously be unaffected thereby.

In particular, the distributed database may be implemented using blockchain technology. That is, the distributed database may be a blockchain or implement blockchain technology.

A transaction that is posted to the ledger of the distributed database may involve a number of counterparties. Examples for a counterparty include a counterparty that has posted the transaction, a counterparty that transmits an amount of cryptocurrency, a counterparty that receives an amount of cryptocurrency, a counterparty the transmits a sensor value and/or an actuator setpoint, a counterparty that receives the sensor value and/or the actuator setpoint, a counterparty that publishes information in the ledger, and the like.

Each of the counterparties may be identified in the transaction using respective counterparty identity information. That is, a respective counterparty identity information identifying a respective one of the number of counterparties may be associated with and/or included in the transaction and/or data included in the transaction.

In particular, the counterparty identity information may be information cryptographically derived, such as by applying a cryptographic hash function, from a public key of a cryptographic key pair owned by the counterparty. Specifically, the counter party identity information may be a so-called "blockchain identifier" or "blockchain ID".

The cryptographic key pair owned by the counterparty and forming that basis for the counterparty identity information to be associated with a transaction in the ledger may be referred to as a "cryptographic key pair used for accessing a ledger of the database system" or "cryptographic key pair for ledger access".

When a counterparty of a previous transaction posts a follow-up transaction to the previous transaction to the ledger, the counterparty may use the private key of the cryptographic key pair for ledger access to create a cryptographic proof, such as digital signature, to proof that it is the same counterparty that was the counterparty of the previous transaction.

For example, a counterparty wishing to spend an amount of cryptocurrency may use the private key of the cryptographic key pair for ledger access to create a cryptographic proof that it was a counterparty to a previous transaction in which it has received the corresponding amount of cryptocurrency. This may enable the nodes of the distributed database to reach a consensus that a transaction in which the counterparty spends the amount of cryptographic currency is a valid transaction that is to be included into the consensus version of the ledger.

Thus, the counterparty identity identification included in or associated with a respective transaction of the ledger may allow the nodes of the distributed database system and/or any other third-party device which accesses the ledger of the distributed database system to establish that a counterparty of a first transaction of the ledger and a counterparty of a second transaction of the ledger are the same counterparty, but may not reveal neither the public key of the cryptographic key pair for ledger access of the same counterparty nor any other information relating to an identity of the same counterparty. Thereby, the distributed database may enable anonymized processing of transactions.

The second entity of the issuing device may be configured to access the ledger of the distributed database by communicating with any of the plurality of nodes of the distributed database. Alternatively, the issuing device and/or the second entity thereof may be one of the plurality of nodes of the distributed database and be configured access the instance of the ledger of the distributed database stored thereon.

The expression "a cryptographic response has been posted to the ledger of the distributed database" may refer to a situation in which a transaction including the cryptographic response is included, or confirmed, in the consensus version of the ledger of the distributed database.

The second entity may verify the cryptographic response based on the cryptographic challenge. In particular, the second entity may verify whether the cryptographic response constitutes a valid proof of ownership of the public key by verifying whether the cryptographic response includes a digital record created from the cryptographic challenge using the private key corresponding to the public key. More specifically, the second entity may verify, using the public key, whether the cryptographic response includes a digital signature of the cryptographic challenge created using the private key.

A requesting device that owns a cryptographic key pair may advantageously communicate with the issuing device in a manner corresponding to the features of the issuing device so as to obtain, from the issuing device, a digital certificate that certifies a public key of the cryptographic key pair owned by the requesting device (a public key of the requesting device). More specifically, the obtained digital certificate may advantageously certify that the public key of the requesting device (more precisely, a private key corresponding to the public key) is owned by a specific counterparty to the ledger of the distributed database that is identified by the counterparty identity information included in the ownership information certified by (included in) the digital certificate. The requesting device may advantageously use the private key of the cryptographic key pair to create a cryptographic proof, such as a digital signature, that may be used by any third-party device that is provided with the digital certificate to establish, by using the public key included in the certificate, that the requesting device is identified in the ledger by the counterparty identification included in the ownership information included in the digital certificate.

Thereby, the issuing device is advantageously able to facilitate proofing that a requesting device is a given counterparty to a ledger of a distributed database.

It is noted, herein, that a cryptographic key pair including a private key and a corresponding public key, the ownership information of which is certified by the digital certificate, and a cryptographic key pair from which the counterparty identity information is derived, are not necessarily the same cryptographic key pair, and may be different cryptographic key pairs.

That is, the receiving device may own a first cryptographic key pair that may be used, for example, to securely communicate with third-party devices. The communication may happen outside an environment of the distributed database. The receiving device may further own a second cryptographic key pair that may be used for accessing the ledger of the digital database. More specifically, the first cryptographic key pair may be used for SSL/TLS communication according to a HTTPS protocol, and the second cryptographic key pair may be a cryptographic keypair included in a blockchain wallet.

According to an embodiment of the issuing device according to the first aspect, the cryptographic response includes the cryptographic challenge and a data structure created based on the cryptographic challenge using a private key corresponding to the public key.

In particular, the cryptographic response is verified by the second entity to constitute a valid proof of ownership of the public key if the cryptographic data structure included in the cryptographic response is verified by the second entity to constitute a cryptographic data structure created using a private key corresponding to the public key.

It is noted that the second entity may verify whether the cryptographic data structure included in the cryptographic response has been created using a private key corresponding to the public key when the second entity is aware of both the public key and the cryptographic challenge. The second entity may be configured to obtain the public key from the certification request and to obtain the cryptographic challenge from the cryptographic response.

That is, according to the present embodiment, the issuing device may advantageously operate in a stateless manner. More precisely, the first entity and the second entity may operate in a stateless manner with respect to each other. Specifically, there may be no need for the first entity of the issuing device to remember or store the cryptographic challenge after transmitting the cryptographic challenge to the requesting device, because the cryptographic challenge is included in the cryptographic response.

For example, the cryptographic challenge may include an encrypted or protected cookie including state information, such as a time information, a physical address or MAC, or the ownership information of the public key. In other words, the cryptographic challenge may include state information that may be used by the second entity to verify whether the cryptographic response is indeed a cryptographic response not to any arbitrary cryptographic challenge, but to the cryptographic challenge previously transmitted by the first entity. Thereby, the issuing device may advantageously not need to be provided with a state storage for storing the state information in a time between transmission of the cryptographic challenge by the first entity and reception of the cryptographic response by the second entity.

According to a further embodiment of the issuing device according to the first aspect, the first entity is further configured to obtain the ownership information from the received challenge request and store the challenge information in association with the obtained ownership information. The second entity is further configured to retrieve the cryptographic challenge from the challenge information stored in the first entity in association with the ownership information of the certification request; and verify the cryptographic response based on the cryptographic challenge retrieved from the challenge information stored in the first entity.

That is, the challenge request may not merely serve as a trigger for creating the cryptographic response but may include the counterparty identity information to be certified as ownership information of the public key.

In particular, the first entity may store the cryptographic challenge in association with the ownership information included in the challenge request, and the second entity may verify the cryptographic response based on the cryptographic challenge that is stored in the first entity in association with ownership information that matches the ownership information of the certification request. Thereby, advantageously, the second entity may provide that the cryptographic response is not just a valid cryptographic response to an arbitrary cryptographic challenge that may be included in the cryptographic challenge but is a valid cryptographic response to the specific cryptographic challenge that was previously transmitted to the requesting device by the first entity. In other words, the issuing device may operate in a stateful manner.

Thereby, a level of security when issuing the digital certificate may be advantageously improved.

It is noted that according to the present embodiment, there is no need for the cryptographic response to include the cryptographic challenge. The cryptographic response may merely include the cryptographic data structure created using a private key corresponding to the public key, such as the digital signature of the cryptographic challenge.

According to a further embodiment of the issuing device according to the first aspect, the first entity is further configured to store the challenge information further in association with a time at which the challenge information is transmitted to the requesting device. The second entity is further configured to: issue the digital certificate under the further condition that a difference between a time at which the cryptographic response has been posted to the ledger of the distributed database and the time at which the challenge information has been transmitted to the requesting device by the first entity is less than a predetermined timeliness threshold.

The predetermined timeliness threshold may be a time range suitably selected under consideration of factors such as an expected network latency, an allowable processing time used by the requesting device for creating the cryptographic response, a time required by the distributed database for confirming a block and/or posting a transaction, an additional tolerance margin, and the like.

The time at which the cryptographic response has been posted to the ledger of the distributed database may be obtained by the second entity, (for example, by monitoring the distributed ledger), and/or from a timestamp associated with the cryptographic response in the ledger. For example, the timestamp may be included in or associated with the transaction that includes the cryptographic response, and a consensus protocol of the distributed database may cause the plurality of nodes to only accept a posted transaction into the ledger if any timestamp included therein or associated therewith is not newer than a current time.

The issuing device may thereby advantageously not issue the digital certificate, (that is, decline issuance of the digital certificate), if the requesting device uses an excessive amount of processing time to create the cryptographic response.

Thereby, a level of security when issuing the digital certificate may be advantageously improved further.

According to a further embodiment of the issuing device according to the first aspect, the ownership information included in the challenge request further includes common name information identifying a server entity. The first entity is further configured to generate a random path and include the random path into the challenge information transmitted to the requesting device. The second entity is further configured to issue the digital certificate under the condition that the second entity further successfully verifies that: the cryptographic response to the cryptographic challenge has been published on a server entity identified by the common name information at the random path included in the challenge information; and the cryptographic response published on the server entity constitutes a valid proof of ownership of the public key.

The common name information may be a DNS domain name. The sever entity may be a HTTP or HTTPS server.

Similar to the cryptographic response to be posted to the ledger of the distributed database, the cryptographic response to be published on the server entity may refer to a data structure to be created by the requesting device based on the cryptographic challenge and using the private key corresponding to the public key, and may be a digital signature of the cryptographic challenge created using the private key.

By posting the cryptographic response to the server entity under the random path, the requesting device may proof that it has administrative privileges on the server entity.

That is, according to the present embodiment, the issuing device may advantageously issue a digital certificate that certifies a) that the requesting device is the counterparty to the ledger of the distributed database that is identified by the counterparty identity information included in the ownership information included in the issued digital certificate, and b) that the requesting device has rightful administrative privileges on the server entity that is identify by the common name included in the ownership information included in the issued digital certificate.

That is, the issued digital certificate may advantageously be tied both to the counterparty identity information relating to the distributed database and to the common name related to the server entity.

According to the present embodiment, if the requesting device needs to publish a large amount of information, the requesting device may publish the large amount of information on the server entity and may post a link to the large amount of information to the ledger of the distributed database. The requesting device may further install the digital certificate tied to its counterparty identity information and to the common name of the server entity on the server entity. Then, advantageously, a third party that views the link to the large amount of information in the ledger of the distributed database, may follow that link, may receive the digital certificate from the server entity, and may use the digital certificate to confirm and trust that the server entity is indeed administered by the same requesting device that has posted the link to the digital ledger.

That is, advantageously, a storage space required to store a large amount of information in the distributed database may be reduced.

According to a further embodiment of the issuing device according to the first aspect, the ownership information included in the certification request further includes network address information of the server entity. The second entity is further configured to issue the digital certificate under the condition, that is, under the further condition, that the second entity further successfully verifies that the server entity identified by the common name information and having the cryptographic response published at the random path is reachable under the network address information included in the ownership information of the certification request.

The network address information may be an IPv4 or an IPv6 address, for example.

Thus, the digital certificate issued by the issuing device may advantageously be tied both to the counterparty identity information of the requesting device, and to the common name information of the server entity, and to the network address information of the server entity.

According to a further embodiment of the issuing device according to the first aspect, the second entity is further configured to, upon issuing the digital certificate, post the digital certificate to the ledger of the distributed database.

That is, a server entity (also labeled "original server entity" hereinbelow) may employ a digital certificate issued by the issuing device (certificate authority, CA) to proof that it is administrated by the rightful owner identified by the ownership information included in the certificate. However, if an intruder manages to compromise both a domain name service and the certificate authority, the intruder may want to set up a rogue server entity that fakes to be the original server entity. A rogue digital certificate provided by such a rogue server entity may differ from the certificate of the original server entity only by a fingerprint thereof.

However, if the digital certificate is posted to an immutable, trusted distributed database, such as a blockchain, and if the posted digital certificate is tied to a common name information, (e.g., a domain name), to network address information, (e.g., an IP address), and to counterparty identity information, (e.g., a blockchain ID), of the original server entity, a third-party device wishing to contact the server entity may verify whether a digital certificate presented by the server entity matches the digital certificate of the server entity posted in the ledger of the distributed database. Thereby, the third-party device may advantageously detect whether the sever entity is the original server entity or the rogue server entity, even if a domain name system and a certificate authority have been compromised.

More particularly, when the digital certificate that is posted to the ledger of the distributed database is tied to the blockchain identity (e.g., counterparty identity information) of the server entity (or of a requesting device having administrative privileges on the server entity), an intruder may not be able to post an updated rogue digital certificate to the ledger of the distributed ledger without being noticed, because the intruder may not own the cryptographic key pair from which the counterparty identity information is derived.

That is, the issuing device of the present embodiment may advantageously issue the digital certificate that is configured to improve a level of security of a certificate-based server infrastructure.

According to a further embodiment, the issuing device according to the first aspect is further configured to, when the digital certificate is to be revoked, post revocation information of the digital certificate to the ledger of the distributed database.

The revocation information may include the digital certificate that is to be revoked and/or a digital fingerprint thereof. The revocation information may further include an information indicating that and/or, form which date, the digital certificate is to be considered to be revoked.

The proposed use of a distributed database, such as a blockchain, for posting certificate revocation information may simplify and provide added security for certificate revocation.

Any embodiment of the first aspect may be combined with any embodiment of the first aspect to obtain another embodiment of the first aspect.

According to a second aspect, a requesting device for requesting a digital certificate includes a first unit configured to transmit a challenge request to and receive challenge information including a cryptographic challenge from an issuing device. The requesting device further includes a second unit configured to create, using a private key of a cryptographic key pair, a cryptographic response to the cryptographic challenge, the cryptographic response constituting a valid proof of ownership of a public key of the cryptographic key pair. The requesting device further includes a third unit configured to post the created cryptographic response to a ledger of a distributed database such that the posted cryptographic response is associated therein with counterparty identity information of the requesting device. The requesting device further includes a fourth unit configured to create a certification request including the public key and ownership information of the public key of the cryptographic key pair, wherein the ownership information includes the counterparty identity information of the requesting device. The requesting device further includes a fifth unit configured to transmit the certification request to and receive an issued digital certificate certifying the ownership information of the public key from the issuing device.

The embodiments, features, and advantages described with reference to the issuing device of the first aspect apply mutatis mutandis to the requesting device of the second aspect.

That is, specifically, the requesting device of the second aspect may advantageously communicate with the issuing device of the first aspect to obtain a digital certificate having the features described for the issuing device of the first aspect and enjoy the benefits of the digital certificate that have been described for the issuing device of the first aspect.

In particular, the cryptographic key pair is a cryptographic key pair owned by the requesting device. The cryptographic key pair may be stored in the requesting device, in a storage unit thereof, in a secure element thereof. The cryptographic key pair may also be stored externally to the requesting device, and the requesting device may be provided with access to the externally stored cryptographic key pair. The access to the externally stored cryptographic key pair may be restricted, such as by a security policy or the like, or may be exclusive.

According to an embodiment of the requesting device of the second aspect, the ownership information includes common name information identifying a server entity and/or network address information of the server entity, the server entity being a server entity managed by and/or being a part of the requesting device. The first unit is further configured to include the ownership information into the challenge request and to obtain random path information from the challenge response. The third unit is further configured to publish the created cryptographic response on the server entity at a path identified by the obtained random path information.

The embodiments, features, and advantages described with reference to embodiments of the issuing device of the first aspect in which the ownership information includes common name information and/or network address information of a server entity apply mutatis mutandis to the requesting device of the present embodiment.

According to a third aspect, a computing platform is provided, the computing platform including an issuing device of the first aspect or any of its embodiments and a number of requesting devices of the second aspect or any of its embodiments.

The computing platform may be an information technology platform used to implement an industrial automation system. The issuing device may be a certificate authority, the number of requesting devices may be nodes or server entities of the industrial automation system and the like.

In the issuing device of the first aspect or any of its embodiments, the requesting device of the second aspect or any of its embodiments and/or the computing platform of the third aspect or any of its embodiments, the distributed database is a blockchain; and the counterparty identity information is a blockchain identity.

The respective entity, (e.g., the first entity, second entity, third entity, server entity, the first to fifth unit, the issuing device, and the requesting device), may be implemented in hardware and/or in software. If the entity is implemented in hardware, it may be embodied as a device, e.g., as a computer or as a processor or as a part of a system, e.g., a computer system. If the entity is implemented in software, the entity may be embodied as a computer program product, as a function, as a routine, as a program code, or as an executable object.

According to a fourth aspect, a method for issuing a digital certificate is proposed. The method is for being performed by an issuing device. The method includes responding to a challenge request received from a requesting device by transmitting challenge information including a cryptographic challenge to the requesting device. The method further includes responding to a certification request received from the requesting device, the certification request including a public key and ownership information of the public key, by issuing a digital certificate certifying the ownership information of the public key. Herein, the ownership information includes counterparty identity information relating to a ledger of a distributed database. The digital certificate is issued under the condition that the issuing device successfully verifies that: cryptographic response to the cryptographic challenge has been posted to the ledger of the distributed database; that the cryptographic response is associated, in the ledger, with the counterparty identity information included in the ownership information of the certification request; and that the cryptographic response constitutes a valid proof of ownership of the public key.

The embodiments, features, and advantages described with reference to the issuing device of the first aspect apply mutatis mutandis to the issuing method of the fourth aspect.

According to a fifth aspect, a method for requesting a digital certificate is proposed. The method is for being performed by a requesting device. The method includes transmitting a challenge request to and receiving challenge information including a cryptographic challenge from an issuing device. The method further includes creating, using a private key of a cryptographic key pair, a cryptographic response to the cryptographic challenge, the cryptographic response constituting a valid proof of ownership of a public key of the cryptographic key pair. The method further includes posting the created cryptographic response to a ledger of a distributed database such that the posted cryptographic response is associated therein with counterparty identity information of the requesting device. The method further includes creating a certification request including the public key and ownership information of the public key of the cryptographic key pair, wherein the ownership information include the counterparty identity information of the requesting device. The method further includes transmitting the certification request to and receiving an issued digital certificate certifying the ownership information of the public key from the issuing device.

The embodiments, features, and advantages described with reference to the requesting device of the second aspect apply mutatis mutandis to the requesting method of the fifth aspect.

The disclosure further relates to a method for issuing a digital certificate including an issuing device executing the acts of the method for issuing a digital certificate of the fourth aspect and a requesting device executing the acts of the method of the fifth aspect.

According to a sixth aspect, the disclosure relates to a computer program product including a program code for executing the above-described method for issuing a digital certificate and/or the above-described method for requesting a digital certificate when run on at least one computer.

A computer program product, such as a computer program device or apparatus, may be embodied as a memory card, USB stick, CD-ROM, DVD, or as a file which may be downloaded from a server in a network. For example, such a file may be provided by transferring the file including the computer program product from a wireless communication network.

Further possible implementations or alternative solutions also encompass combinations—that are not explicitly mentioned herein—of features described above or below with regard to the embodiments. The person skilled in the art may also add individual or isolated aspects and features to the most basic form of the disclosure.

BRIEF DESCRIPTION OF THE DRAWINGS

Further embodiments, features, and advantages of the present disclosure will become apparent from the subsequent description and claims, taken in conjunction with the accompanying drawings, in which:

FIG. 12 illustrates a challenge request according to the third exemplary embodiment.

FIG. 13 illustrates challenge information according to the third exemplary embodiment.

FIG. 14 illustrates a challenge response according to the third exemplary embodiment.

FIG. 15 illustrates a certification request according to the third exemplary embodiment.

FIG. 16 illustrates a digital certificate according to the third exemplary embodiment.

In the Figures, like reference numerals designate like or functionally equivalent elements, unless otherwise indicated.

DETAILED DESCRIPTION

Figure 1:
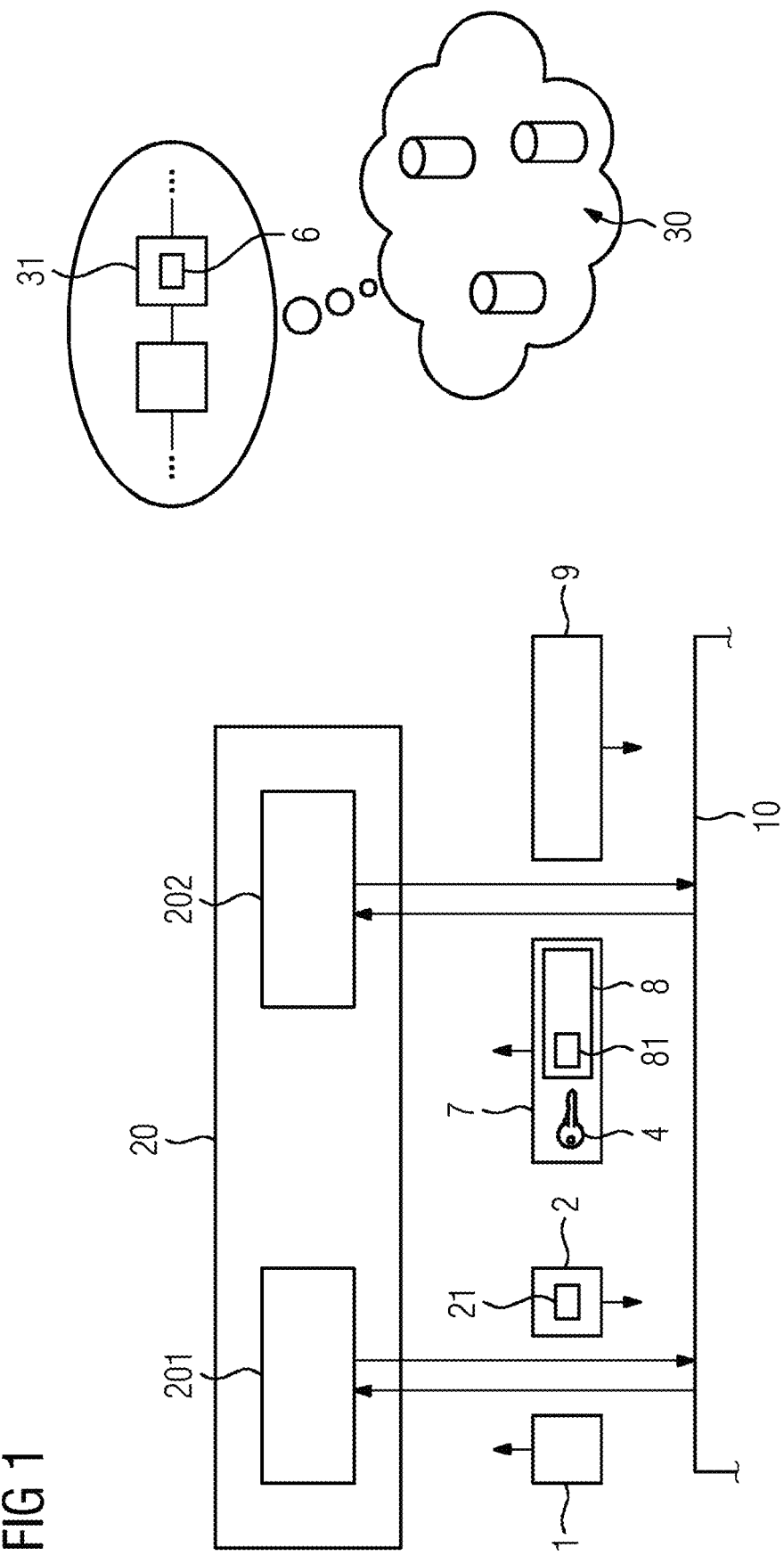
FIG. 1 schematically illustrates an issuing device according to a first exemplary embodiment.
Figure 2:
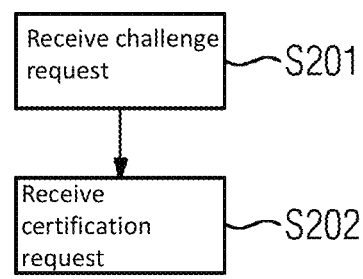
FIG. 2 illustrates a method for issuing a digital certificate according to the first exemplary embodiment.

FIG. 1 schematically illustrates an issuing device 20 and FIG. 2 illustrates a method for issuing a digital certificate 9 according to the first exemplary embodiment. Reference will be made to FIG. 1 and FIG. 2 in conjunction.

FIG. 1 shows the issuing device 20 and further schematically shows a requesting device 10 and a distributed database 30.

The distributed database 30 hosts or stores a ledger 31, which is schematically shown as a chain of blocks, each block including a number of transactions. One of the transactions is shown by way of example at 6.

The issuing device 20 includes a first entity 201 and a second entity 202.

In act S201 of the method for issuing the digital certificate 9, the first entity 201 receives a challenge request 1 from the requesting device 10 and responds by transmitting challenge information 2 including a cryptographic challenge 21 to the requesting device 10.

In act S202, the second entity 202 receives a certification request 7 from the requesting device 10. The certification request 7 includes a public key 4 and ownership information 8 of the public key 4. The ownership information 8 includes counterparty identity information 81 which relates to the ledger 31 of the distributed database 30.

That is, the ownership information 8 may be regarded as designating a counterparty to transactions posted in the ledger 31 as the owner of the public key 4 (that is, as the owner of a private key (not shown) associated with the public key 4).

Further, in act S202, the second entity 202 responds to the certification request 7 by issuing the digital certificate 9 certifying the ownership information 8 of the public key 4.

Herein, the second entity 202 only issues and transmits the digital certificate 9 under certain conditions. Specifically, the second entity 202 issues the digital certificate 9 if the second entity 202 successfully verifies the following three conditions: a) whether a cryptographic response 6 to the cryptographic challenge 21 has been posted to the ledger 31 of the distributed database 30; b) whether the cryptographic response 6 is associated, in the ledger 31, with the counterparty identity information 81 included in the ownership information 8 of the certification request 7; c) whether the cryptographic response 6 constitutes a valid proof of ownership of the public key 4. Only if conditions a) to c) are met, the digital certificate 9 is issued.

By way of example, FIG. 1 shows that the issued digital certificate 9 is transmitted to the requesting device 10. However, the issued digital certificate 9 may be published in the ledger 31 instead or in addition thereto.

The issuing device 20 is advantageously able to automatically issue a requested digital certificate 9 which certifies a public key 4 and ownership information 8 thereof which include counterparty information 81 indicating a counterparty to a ledger 31 of a distributed database 30.

Figure 3:
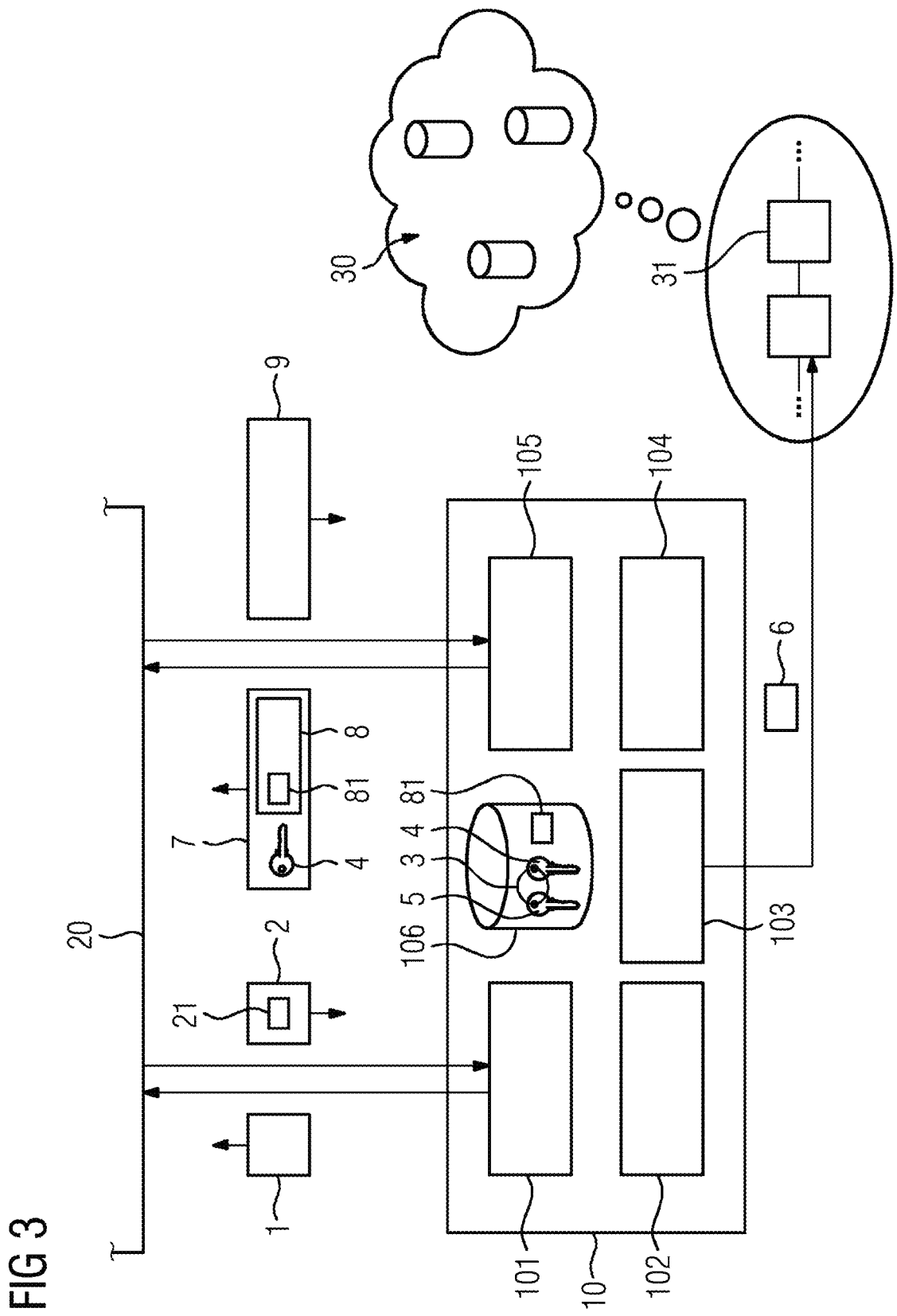
FIG. 3 schematically illustrates a requesting device according to the first exemplary embodiment.
Figure 4:
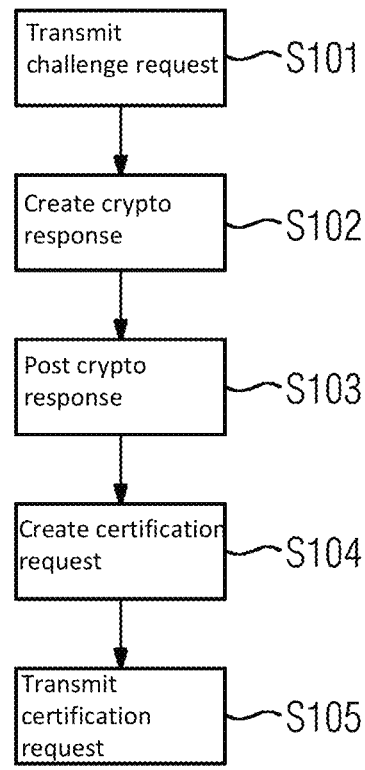
FIG. 4 illustrates a method for requesting a digital certificate according to the first exemplary embodiment.

FIG. 3 schematically illustrates a requesting device 10 and FIG. 4 illustrates a method for requesting a digital certificate 9 according to the first exemplary embodiment. Reference will be made to FIG. 3 and FIG. 4 in conjunction. Description of the issuing device 20 and the distributed database 30 will not be repeated.

The requesting device 10 includes a first unit 101, a second unit 102, a third unit 103, a fourth unit 104, a fifth unit 105, and a storage unit 106.

The storage unit 106 stores an asymmetric cryptographic key pair 3 including a public key 4 and a corresponding private key 5. The storage unit 106 further stores counterparty identity information 81 for use when accessing the ledger 31 of the distributed database 30. It is noted that the storage unit 106 is optional and the cryptographic key pair 3 and the counterparty identity information 81 may also be stored in any of the first 101 to fifth unit 101-105 and/or may be stored external to the issuing device 20 in a manner such that the issuing device 20 is able to access the asymmetric cryptographic key pair 3 and the counterparty identity information 81.

In act S101 of the method for requesting the certificate 9, the first unit 101 transmits a challenge request 1 to the issuing device 20 and receives challenge information 2 including a cryptographic challenge 21 from the issuing device 20.

In act S102, the second unit 102 creates, using the private key 5 of the cryptographic key pair 3, a cryptographic response 6 to the cryptographic challenge 21. By virtue of being created in this way, the cryptographic response 6 constitutes a valid proof of ownership of the public key 4 of the cryptographic key pair 3.

In act S103, the third unit 103 posts the cryptographic response 6 to the ledger 31 of a distributed database 30. As a result, the posted cryptographic response 6 is associated in the ledger 31 with the counterparty identity information 81 of the requesting device 10.

It is noted that the storage unit 106 or the third unit 103 may store a secret that enables the third unit 103 to post a transaction, such as the cryptographic response 6 to the ledger 31 such that it is associated therein with the counterparty identity information 81. For example, the counterparty identity information 81 may be a username and the secret may be a password associated with the username. Alternatively, the counterparty identity information 81 or may be information cryptographically derived from a second cryptographic key pair (not shown in FIG. 3) stored in the storage unit 106, wherein the private key of the second cryptographic key pair may be identified as the secret. Thereby, only the requesting device 10 and no other entity or device may post a transaction to the ledger 31 such that it is associated with the same counterparty identity information 81.

By posting the cryptographic response 6 created using the private key 5 such that the cryptographic response 6 is associated with the counterparty identity information 81 in the ledger 31, the requesting device 10 demonstrates to the issuing device 20 that it is a) able to use the public key 4 and b) able to act as a specific counterparty to transactions posted in the ledger 31, the specific counterparty being identified by the counterparty identity information 81.

In act S104, the fourth unit 104 creates a certification request 7 including the public key 4 and ownership information 8 of the public key 4. Specifically, the ownership information 8 includes the counterparty identity information 81 of the requesting device 10.

In act S105, the fifth unit 105 transmits the certification request 7 to the issuing device 20 and receives an issued digital certificate 9. The issued digital certificate 9 certifies the public key 4 and the ownership information 8 of the public key 4, which includes the counterparty identity information 81.

Figure 5:
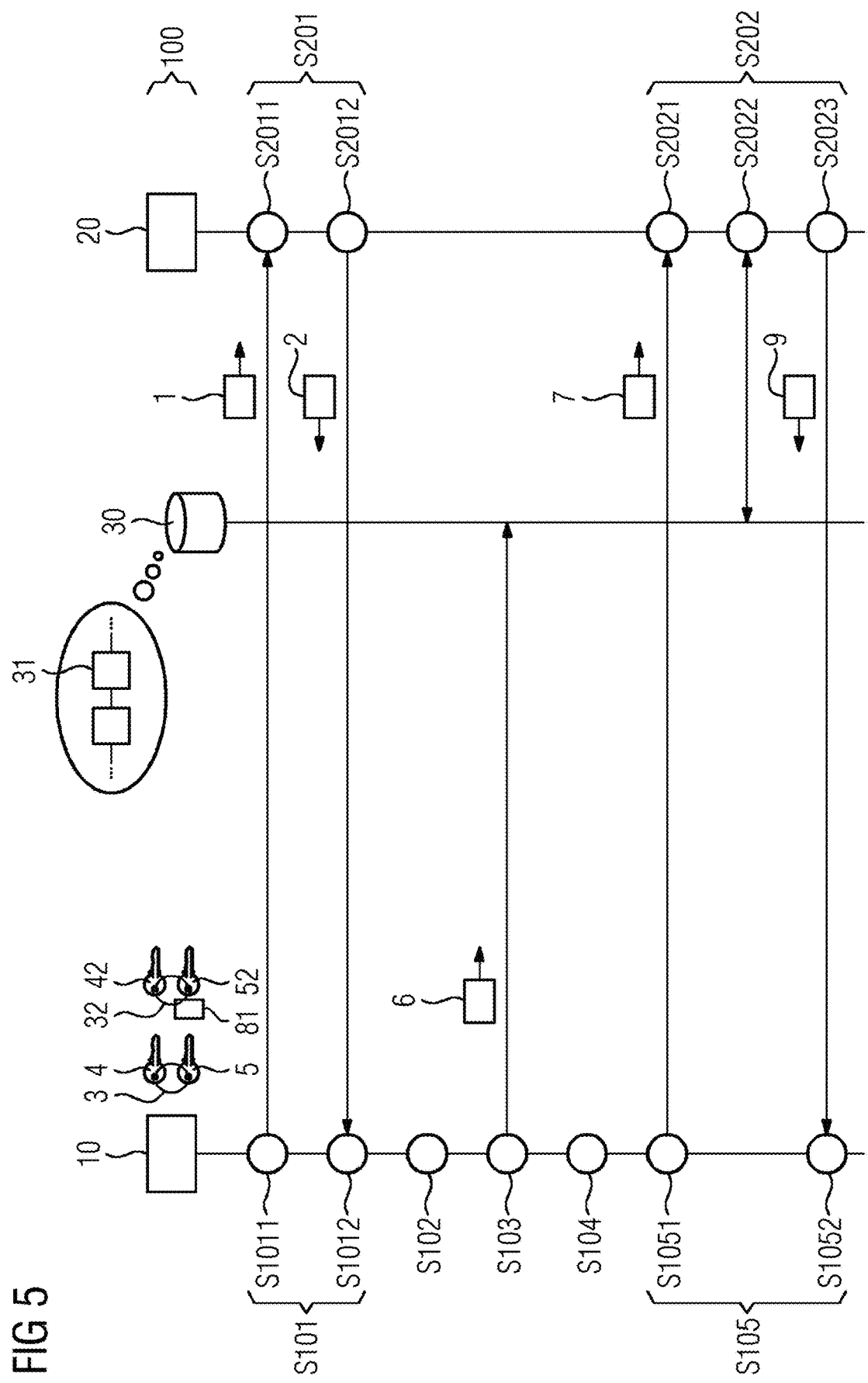
FIG. 5 shows a computing platform and a timing chart of a method for requesting and a method for issuing a digital certificate according to a second exemplary embodiment.

FIG. 5 shows a computing platform 100 and a timing chart of a method for requesting and a method for issuing a digital certificate 9 according to a second exemplary embodiment. FIGS. 6 through 10 illustrate various data structures used in the illustrated methods. The second exemplary embodiment will now be discussed with reference to FIGS. 5 to 10.

The computing platform 100 shown in FIG. 5 includes at least one requesting device 10, a certificate authority 20 (CA, example of an issuing device) and a blockchain 30 (example of a distributed database).

The blockchain 30 is conceptually visualized as a single node 30. However, it will be understood that the blockchain 30 may be implemented using a distributed plurality of nodes. The timing charts shown in FIG. 5 shows the requesting device 10 and the certificate authority 20 both communicating with the blockchain 30. The requesting device 10 may communicate with one of the distributed plurality of nodes and the certificate authority 20 may communicate with the same or with a different one of the distributed plurality of nodes of the blockchain 30. Technology of the blockchain 30 provides that all operations performed by the requesting device 10, the certificate authority 20, or any third-party device (not shown) with any one of the distributed plurality of nodes of the blockchain 30 will be performed using and/or will be reflected within a same consensus version of the ledger 31 of the blockchain 30.

The requesting device 10 is shown as owning a first cryptographic key pair 3 and a second cryptographic key pair 32.

The first cryptographic key pair 3 includes a first public key 4 and a first private key 5. The first cryptographic key pair 3 is used by the requesting device 10 for encrypted communication with a plurality of third-party devices (not shown) via a communication protocol such as SSL/TLS and the like.

The second cryptographic key pair 32 includes a second public key 42 and a second private key 52. The second cryptographic key pair 32 is used by the requesting device 10 for accessing the blockchain 30. Specifically, the second private key 52 may be used by the requesting device 10 to sign a transaction (not shown) that it posts to the ledger 31 of the blockchain 30. A transaction (not shown) posted to the ledger 31 in this way will be associated in the ledger 31 by a blockchain ID 81 (example of counterparty identification information). The blockchain ID 81 is a piece of information that is cryptographically derived from the second private key 52. That is, the second cryptographic key pair 32 enables the requesting device 10 to act as a counterparty to the ledger 31 of the blockchain 30 that is identified by the blockchain ID 81.

For the purpose of communicating with a third-party device (not shown) via SSL/TLS and the like, the requesting device 10 may be interested in obtaining a digital certificate 9 that certifies that the requesting device 10, which uses the first cryptographic key pair 3 to proof its authenticity versus the third-party device, is identical with a counterparty to the ledger 31 that is identified by the blockchain ID 81.

It is noted that the requesting device 10 of the second exemplary embodiment is configured in a manner similar to the requesting device 10 of the first exemplary embodiment. For brevity, a functional structure of the requesting device 10 is not shown in FIG. 5. Functionality attributed to the requesting device 10 in the following description may be suitably attributed to a respective one of the first to sixth unit 101-106 shown in FIG. 3 by referring to the preceding description of the first exemplary embodiment. Similarly, functionality attributed to the certificate authority 20 in the following description may be suitably attributed to a respective one of the first or second unit 101, 102 shown in FIG. 1 by referring to the preceding description of the issuing device 20 of the first embodiment.

Figure 6:
FIG. 6 illustrates a challenge request according to the second exemplary embodiment.

In act S1011, the requesting device 10 transmits a challenge request 1 to the certificate authority 20. The challenge request 1 is shown in FIG. 6 and may be regarded as a trigger.

Figure 7:
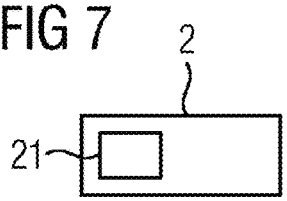
FIG. 7 illustrates challenge information according to the second exemplary embodiment.
Figure 8:
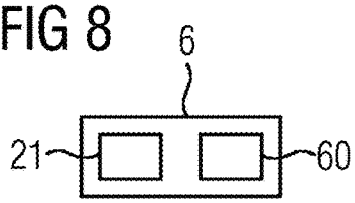
FIG. 8 illustrates a challenge response according to the second exemplary embodiment.

When the certificate authority 20 receives the challenge request 1 in act S2011, it creates challenge information 2. The challenge information 2 is shown in FIG. 7 to include a cryptographic challenge 21. The cryptographic challenge 21 may include a nonce value generated using a pseudo-random generator or the like.

In act S2012, the certificate authority 20 transmits the challenge information 2 to the requesting device 10.

When the requesting device 10 receives the challenge information 2 including the cryptographic challenge 21 at act S1012, the requesting device 10 proceeds to act S102.

In act S102, the requesting device 10 digitally signs the nonce value included in the challenge information 2 using the first private key 5 of the first cryptographic key pair 3 to obtain a digital signature 60. The requesting device 10 creates the cryptographic response 6 shown in FIG. 8, which includes the cryptographic challenge 21 of the challenge information 2 and the digital signature 60 thereof.

In act S103, the requesting device 10 uses the second cryptographic key pair 32 to post the certification request 7 to the ledger 31 of the blockchain 30. Although not shown in FIG. 6, this causes the cryptographic response 6 to become a transaction of the ledger 31 that is associated, in the ledger 31, with the blockchain ID 81, which is cryptographically derived from the second public key 42.

Figure 9:
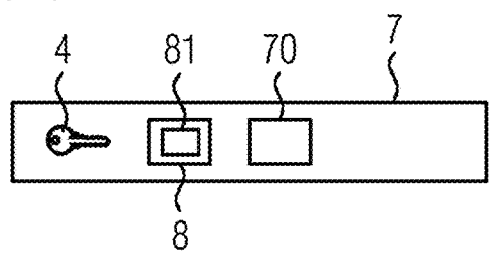
FIG. 9 illustrates a certification request according to the second exemplary embodiment.
Figure 10:
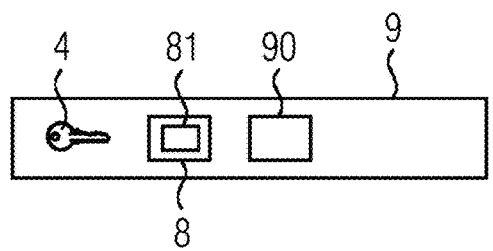
FIG. 10 illustrates a digital certificate according to the second exemplary embodiment.

In act S104, the requesting device 10 creates the certification request 7 shown in FIG. 9. The certification request 7 is configured to request certification of the first public key 4 and ownership information 8 associated with the first public key 4. Specifically, the certification request 7 includes the first public key 4, includes, as part of the ownership information 8 to be certified, the blockchain ID 81, and further includes a digital signature 70. The digital signature 70 is a digital signature of the contents of the certification request 7 (in particular, of the public key 4 and the ownership information 8) and is created by the requesting device 10 using the first private key 5.

In act S1051, the requesting device 10 transmits the certification request 7 to the certificate authority 20.

In act S2021, the certificate authority 20 verifies whether the received certification request 7 is a valid certification request 7. That is, the certificate authority 20 uses the first public key 4 included in the certification request 7 to verify the digital signature 70 included in the certification request 7. By verifying the digital signature 70, the certificate authority 20 may confirm that the requesting device 10 indeed owns the private key 5 corresponding to the first public key 4. If the digital signature 70 is verified successfully, the certificate authority 20 proceeds to act S2022.

In act S2022, the certificate authority 20 communicates with the blockchain 30 (with at least one of the distributed plurality of nodes thereof) and verifies that the cryptographic response 6 has been posted to the ledger 31 of the blockchain 30 and is associated therein with a blockchain ID that matches the blockchain ID 81 of the ownership information 8 included in the certification request 7.

If yes, the certificate authority 20 continues to verify whether the cryptographic response 6 is a valid cryptographic response to the cryptographic challenge 21 by verifying, using the first public key 4 included in the certification request 7, the digital signature 60 of the nonce value of the cryptographic challenge 21 included in the cryptographic response 6. If the digital signature 60 may be successfully verified using the first public key 4, the certificate authority 20 establishes that the cryptographic response 6 constitutes a valid proof of ownership of the first private key 5 corresponding to the first public key 4. In other words, the certificate authority 20 may establish that a counterparty identified in the ledger 31 by the blockchain ID 81 is indeed the owner of the first public key 4 and the first private key 5 corresponding thereto. Based on this finding, the certificate authority 20 proceeds to act S2023.

In act S2023, the certificate authority 20 issues the digital certificate 9 certifying the ownership information 8 of the first public key 4. The digital certificate 9 is shown in FIG. 9. The digital certificate 9 includes the public key 4, the ownership information 8 including the blockchain ID 81, and a digital signature 90 created using a third cryptographic key pair (not shown) that is owned by the certificate authority 20. The digital certificate 9 is transmitted to the requesting device 10. The requesting device 10 receives the issued digital certificate 9 in act S1052.

In the above, attention is drawn to the fact that the cryptographic challenge 21 that was transmitted as part of the challenge information 2 from the certificate authority 20 to the requesting device 10 in act S2012 is included in the cryptographic response 6 posted by the requesting device 10 to the ledger 31 of the blockchain 30 in act S103.

Further, while not shown in FIGS. 5 and 9, the certification request 7 may include an indication of the blockchain 30 and a ledger 31 thereof. The indication may include a network address of one of the distributed plurality of nodes of the blockchain 30, an identifier of the ledger 31, and the like.

That is, when the certificate authority 20 receives the certification request 7, all information required for verifying the certification request 7 in acts S2012 to S2023 is included in the certification request 7 or is available in the ledger 31 of the blockchain 30, an indication of which may also be included in the certification request 7.

In other words, there is no requirement for the certificate authority 20 to memorize, in acts S2011 and S2012, any information after having transmitted the challenge information 2 to the requesting device 10. Alternatively, in terms of FIG. 1 and the first exemplary embodiment, there is no need for information to be passed on from the first entity 201 to the second entity 202. That is, the certificate authority 20 may be operated in a stateless manner. Thereby, the certificate authority 20 may advantageously handle a high volume of certification requests 7 without requiring a large amount of internal state storage.

Figure 11:
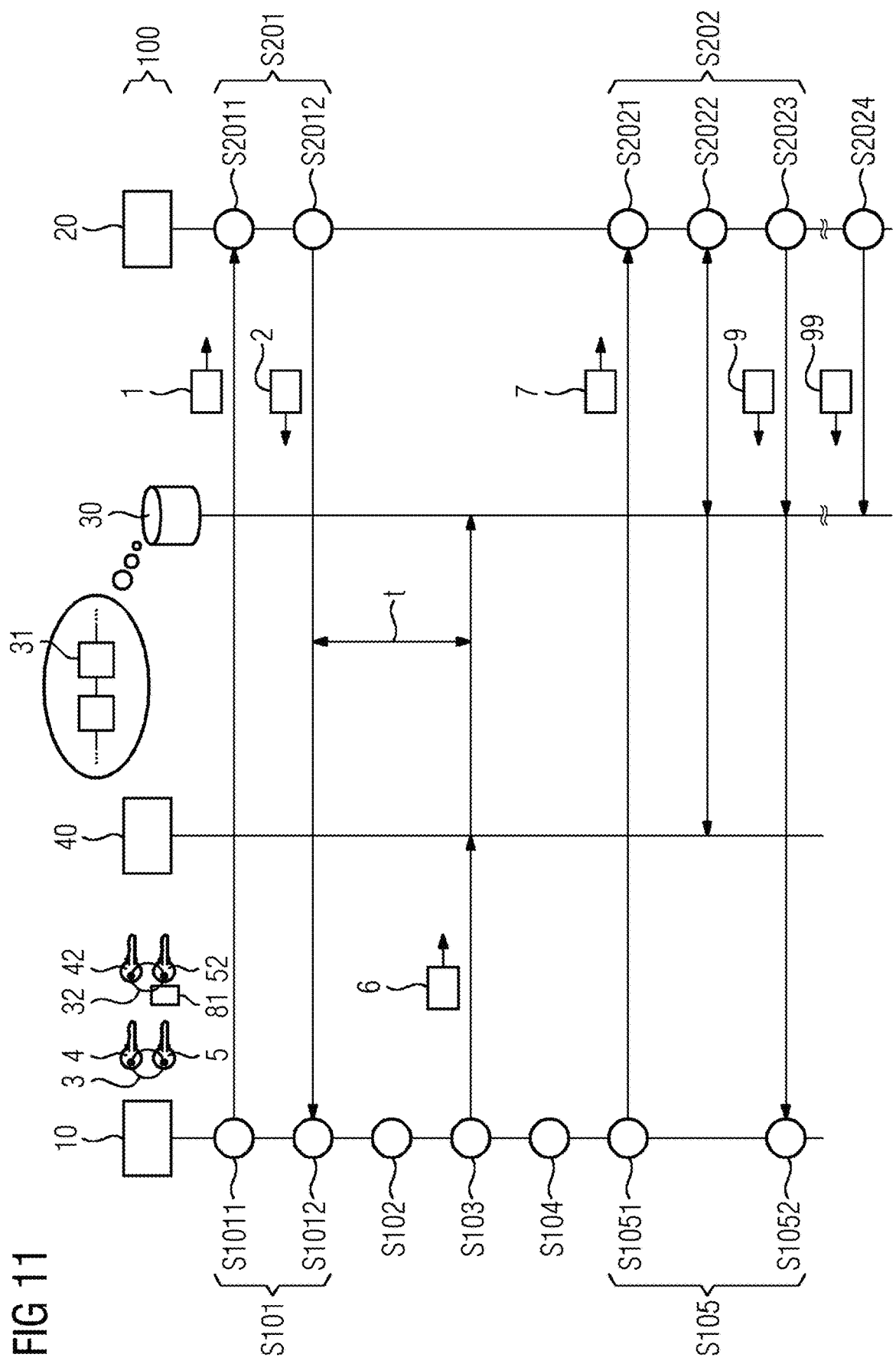
FIG. 11 shows a computing platform and a timing chart of a method for requesting and a method for issuing a digital certificate according to a third exemplary embodiment.

FIG. 11 shows a computing platform 100 and a timing chart of a method for requesting and a method for issuing a digital certificate 9 according to a third exemplary embodiment. FIGS. 12 through 16 illustrate various data structures used in the illustrated method. The third exemplary embodiment will now be discussed with reference to FIGS. 11 to 16. Because the third exemplary embodiment is based on the second exemplary embodiment, only differences between the two will be described.

The computing platform 100 illustrated in FIG. 11 further includes a server entity 40. The server entity 40 may be a HTTP server or the like. The server entity 40 may be a device different from the requesting device 10 or may be embodied integrally with the requesting device 10. The requesting device 10 may have at least administrative privileges to administer a service offered by the server entity 40, such as an HTTP service or the like.

The requesting device 10 may want to obtain a digital certificate 9 that certifies its properties of being a counterparty of the ledger 31 of the blockchain 30 as well as having rightful administrative privileges to the server entity 40.

Thus, as shown in FIG. 15, the ownership information 8 included in the certification request 7 does not merely include the blockchain ID 81, but also includes a domain name 82 of the server entity 40 (which is an example common name information and may be, for example, "www.example.com"), and further includes an IP address 83 of the server entity 40 (which is an example of network address information).

In order to enable verification whether the requesting device 10 has administrative privileges over the server entity 40 indicated by the domain name 82 and the IP address 83, a stateful approach of issuing the digital certificate 9 may be adopted.

That is, the challenge request 1 shown in FIG. 12 that is transmitted to the certificate authority 20 in act S1011 includes the ownership information 8 including the blockchain ID 81, the domain name 82 and the IP address 83 that are to be certified later when the certification request 7 is transmitted to the certificate authority 20 in act S1051.

In response to receiving, in act S2011, the challenge request 1 including the ownership information 8 including the domain name 82, the certificate authority 20 uses a random generator to generate a random path 22 and includes the random path 22 into the challenge information 2 (FIG. 13) to be transmitted to the requesting device 10. "Random", herein, may be understood as meaning a path that is difficult or impossible to predict for the requesting device 10. The random path 22 may look like, merely as an example, "/tmp/23FEC390/9123AC8E/response.dat".

Further, in act S2012, when generating the challenge information 2 including the cryptographic challenge 21 and the random path 22, the certificate authority 20 (first unit 201 thereof, FIG. 1) stores the challenge information 2 (FIG. 13), which includes the cryptographic challenge 21 and the random path 22, in association with the ownership information 8 included in the challenge request 1 and further in association with a timestamp indicative of a time at which it transmits the challenge information 2 back to the requesting device 10 in act S2012.

The cryptographic response 6 created in act S103 by the requesting device 10 is shown in FIG. 14. It is noted that the cryptographic response 6 according to the third exemplary embodiment may only include the digital signature 60 of the cryptographic challenge 21 (of the nonce value included therein) and may not include the cryptographic challenge 21.

In act S103, the requesting device 10 does not only post the cryptographic response 6 to the ledger 31 of the blockchain 30 in association with the blockchain ID 81, but also publishes the cryptographic response 6 (another instance thereof) on the server entity 40 under the random path 22 included in the challenge information 2 that the requesting device 10 has received in act S1012. Using the examples from above, the requesting device 10 may publish the cryptographic response 6 at "http://www.example.com/tmp/23FEC390/9123AC8E/response.dat".

Unlike the certificate authority 20 of the second exemplary embodiment, the certificate authority 20 of the third exemplary embodiment is configured to operate in a stateful manner.

When the certification request 7 is received by the certificate authority 20 in act S2021, the second entity 202 thereof (FIG. 1) uses the ownership information 8 included in the certification request 7 (FIG. 15) to query the first entity 201 thereof (FIG. 1) for matching challenge information 2 (FIG. 13) that was previously sent to the requesting device 10 in response to a challenge request 1 including such ownership information 8.

In act S2022, the certificate authority 20 uses the cryptographic challenge 21 included in the challenge information 2 stored in and obtained from the first entity 201 (FIG. 1) of the certificate authority 20 to verify the cryptographic response 6 that has been posted to the ledger 31 of the blockchain 30 in a similar manner as has been described for the second exemplary embodiment.

Additionally, the certificate authority 20 checks whether a time period t that has passed between the time at which the challenge information 2 was transmitted to the requesting device 10 and a time at which the has been posted to the ledger 31 of the blockchain 30 is smaller than a predetermined timeliness threshold. For example, the time period t may not be allowed to be larger than 5 minutes. If the time period t exceeds the predetermined timeliness threshold, the certificate authority 20 may refrain from issuing the digital certificate 9 as a precaution in case of a brute force attack.

Additionally, because the ownership information 8 also includes the domain name 82, the certificate authority 20 verifies whether another instance of the cryptographic response 6 has been published on the server entity 40 identified by the domain name 82 included in the ownership information 8 of the certification request 7 at the random path 22 included in the previously stored challenge information 2. If yes, the instance of the cryptographic response 6 that is published on the server entity 40 is verified in a similar manner as the cryptographic response 6 that has been posted to the ledger 31 of the blockchain 30.

Additionally, because the ownership information 8 also includes the IP address 83, the certificate authority 20 further verifies whether the server entity 40 identified by the domain name 82 is reachable at the IP address 83. To this end, the certificate authority 20 may contact a DNS server (not shown) to determine an IP address of the server entity 40 and/or connect an entity located at the IP address 83 using HTTP or the like and verify whether an instance of cryptographic response 6 is published at the random path 22 on the entity located at the IP address 83.

If the above verifications are successful, the digital certificate 9 is issued in act S2023. The digital certificate certifies, see FIG. 16, that an owner of the public key 4 included therein is a counterparty identified by the blockchain ID 81 included therein, certifies that the owner of the public key 4 has rightful administrative privileges for a server entity 40 located at the domain name 82 included therein, and further certifies the IP address 83 of the server entity 40.

In act S2023, the digital certificate 9 is not only transmitted to the requesting device 10 but is also posted in the ledger 31 of the blockchain 30.

Thereby, any third-party device (not shown) that communicates with the server entity 40 and is in a trust relationship with the certificate authority 20 may obtain, from the ledger 31 of the blockchain 30, a trusted certificate digital certificate 9 which certifies a blockchain ID 81, a domain name 82, and an IP address 83 of the server entity 40.

Let us assume that a rogue server device (not shown) hijacks a DNS server (not shown) and redirects traffic directed to the server device 40 to an IP address of the rogue server device.

Conventionally, the rogue server device will be noticed if it fails to present the digital certificate 9 that is digitally signed by the certificate authority 20.

However, a hijacker may also gain control of the certificate authority 20 and cause the certificate authority 20 to issue a rogue digital certificate 9 for the rogue server device. Such a situation would go unnoticed conventionally because the third-party device accessing the rogue server device at the hijacked IP address would trust the rogue digital certificate.

However, because the original digital certificate 9 is posted in the immutable and trusted ledger 31 of the blockchain 30, the third-party device may advantageously notice that a digital fingerprint of the rogue digital certificate does not match a digital fingerprint of the original digital certificate 9 that is posted in the ledger 31 and may advantageously distrust the rogue service device based on this finding.

Now, the hijacker may try to post the rogue digital certificate to the ledger 31 of the blockchain 30. However, as long as the hijacker is unable to use the second cryptographic key pair 32, the hijacker is not able to post the rogue digital certificate to the ledger 31 such that it is associated therein with the blockchain ID 81 of the server entity 40 with which the original digital certificate 9 is associated in the ledger 31. Therefore, by comparing a blockchain ID of the rogue digital certificate in the ledger 31 with the blockchain Id 81 of the original digital certificate 9 in the ledger 31, the third-party device may still be able to detect that hijacking is taking place.

Because the digital certificate 9 is tied to the blockchain ID 81, the domain name 82, and the IP address 83 of the server entity 40, an attempt at hijacking traffic directed to the server entity 40 may be more reliably prevented.

At a later time, the digital certificate 9 might need to be revoked, such as if the private key 5 or the second private key 52 of the requesting device 10 have been compromised. In this case, the requesting device 10 may transmit a certificate revocation request (not shown) to the certificate authority 20. If the certificate authority 20 successfully validates the certificate revocation request, the certificate authority 20 may post revocation information 99 related the digital certificate 9 to the ledger 31 of the blockchain 30. Thereby, certificate revocation may be simplified.

Although the present disclosure has been described in accordance with certain embodiments, for the person skilled in the art, modifications are possible in all embodiments.

Specifically, according to the third exemplary embodiment, the ownership information 8 may include the domain name 82, but may also not include the IP address 83, and functionality of the issuing device 20 for checking reachability of the server entity 40 under the IP address 83 may be omitted.

The issuing device 20 of any of the first to third exemplary embodiment may either operate in a stateful or in a stateless manner. That is, a respective challenge request 1 may or may not include the ownership information 8.

A respective challenge request 1 may not include the full ownership information 8 but may include only a portion of the ownership information 8. For example, the challenge request 1 according to some exemplary embodiments may only include the counterparty identity information 81.

Certificate revocation may also be performed by the requesting device 10 itself, rather than the certificate authority 20 posting the revocation information 99 to the ledger 31 of the blockchain 30. Because the certificate 9 is tied to the blockchain ID 81, as long as the revocation information 99 is posted such that it is associated with the same blockchain ID 81, certification may be enabled without a need to involve the certificate authority 20 in the revocation process.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

Although the disclosure has been illustrated and described in detail with the exemplary embodiments, the disclosure is not restricted by the examples disclosed and other variations may be derived therefrom by a person skilled in the art without departing from the protective scope of the disclosure.

REFERENCE NUMERALS 1 challenge request
2 challenge information
3 first cryptographic key pair
4 first public key
5 first private key
6 cryptographic response
7 certification request
8 ownership information
9 digital certificate
10 requesting device
20 issuing device
21 cryptographic challenge
30 distributed database
31 ledger
32 second cryptographic key pair
40 server entity
42 second public key
52 second private key
60 digital signature created using first private key
70 digital signature created using first private key
81 counterparty identity information
82 domain name
83 IP address
90 digital signature created using CA private key
99 revocation information
100 computing platform
101 first unit
102 second unit
103 third unit
104 fourth unit
105 fifth unit
106 storage unit
201 first entity
202 second entity
S101-S2023 method acts
t timeliness threshold

The invention claimed is:
1. An issuing device for issuing a digital certificate, the issuing device comprising:
a first entity comprising a hardware processor configured to respond to a challenge request received from a requesting device by transmitting challenge information comprising a cryptographic challenge to the requesting device; and
a second entity comprising a hardware processor configured to respond to a certification request received from the requesting device, the certification request comprising a public key and ownership information of the public key, by issuing the digital certificate certifying the ownership information of the public key, wherein the ownership information comprises counterparty identity information relating to a ledger of a distributed database, and wherein the second entity is further configured to issue the digital certificate under condition that the second entity successfully verifies that:
- a cryptographic response to the cryptographic challenge has been posted to the ledger of the distributed database;
- the cryptographic response is associated, in the ledger, with the counterparty identity information included in the ownership information of the certification request; and
- the cryptographic response constitutes a valid proof of ownership of the public key, wherein the digital certificate provides an owner of the public key administrative privileges to a server entity, and wherein an attempt to access administrative privileges of the server entity is prevented when a digital footprint of a rogue digital certificate does not match with the digital certificate posted to the ledger of the distributed database.

2. The issuing device of claim 1, wherein the cryptographic response comprises the cryptographic challenge and a cryptographic data structure created based on the cryptographic challenge using a private key corresponding to the public key.

3. The issuing device of claim 1, wherein the first entity is further configured to obtain the ownership information from the received challenge request and store the challenge information in association with the obtained ownership information, and wherein the second entity is further configured to:
- retrieve the cryptographic challenge from the challenge information stored in the first entity in association with the ownership information of the certification request; and
- verify the cryptographic response based on the cryptographic challenge retrieved from the challenge information stored in the first entity.

4. The issuing device of claim 3, wherein the first entity is further configured to store the challenge information further in association with a time at which the challenge information is transmitted to the requesting device, and wherein the second entity is further configured to issue the digital certificate under further condition that a difference between a time at which the cryptographic response has been posted to the ledger of the distributed database and the time at which the challenge information has been transmitted to the requesting device by the first entity is less than a predetermined timeliness threshold.

5. The issuing device of claim 3, wherein the ownership information included in the challenge request further comprises common name information identifying the server entity, wherein the first entity is further configured to generate a random path and include the random path into the challenge information transmitted to the requesting device, and wherein the second entity is further configured to issue the digital certificate under condition that the second entity further successfully verifies that:
- the cryptographic response to the cryptographic challenge has been published on the server entity identified by the common name information at the random path included in the challenge information; and
- the cryptographic response published on the server entity constitutes the valid proof of ownership of the public key.

6. The issuing device of claim 5, wherein the ownership information included in the certification request further comprises network address information of the server entity, and wherein the second entity is further configured to issue the digital certificate under condition that the second entity further successfully verifies that the server entity identified by the common name information and having the cryptographic response published at the random path is reachable under the network address information included in the ownership information of the certification request.

7. The issuing device of claim 1, wherein the second entity is further configured to, upon issuing the digital certificate, post the digital certificate to the ledger of the distributed database.

8. The issuing device of claim 7, wherein the issuing device is configured to, when the digital certificate is to be revoked, post revocation information of the digital certificate to the ledger of the distributed database.

9. The issuing device of claim 1, wherein the distributed database is a blockchain, and wherein the counterparty identity information is a blockchain identity.

10. The issuing device of claim 2, wherein the first entity is further configured to obtain the ownership information from the received challenge request and store the challenge information in association with the obtained ownership information, and wherein the second entity is further configured to:
- retrieve the cryptographic challenge from the challenge information stored in the first entity in association with the ownership information of the certification request; and
- verify the cryptographic response based on the cryptographic challenge retrieved from the challenge information stored in the first entity.

11. The issuing device of claim 10, wherein the first entity is further configured to store the challenge information further in association with a time at which the challenge information is transmitted to the requesting device, and wherein the second entity is further configured to issue the digital certificate under further condition that a difference between a time at which the cryptographic response has been posted to the ledger of the distributed database and the time at which the challenge information has been transmitted to the requesting device by the first entity is less than a predetermined timeliness threshold.

12. The issuing device of claim 11, wherein the ownership information included in the challenge request further comprises common name information identifying the server entity, wherein the first entity is further configured to generate a random path and include the random path into the challenge information transmitted to the requesting device, and wherein the second entity is further configured to issue the digital certificate under condition that the second entity further successfully verifies that:
- the cryptographic response to the cryptographic challenge has been published on the server entity identified by the common name information at the random path included in the challenge information; and
the cryptographic response published on the server entity constitutes the valid proof of ownership of the public key.

13. The issuing device of claim 12, wherein the ownership information included in the certification request further comprises network address information of the server entity, and
wherein the second entity is further configured to issue the digital certificate under condition that the second entity further successfully verifies that the server entity identified by the common name information and having the cryptographic response published at the random path is reachable under the network address information included in the ownership information of the certification request.

14. The issuing device of claim 4, wherein the ownership information included in the challenge request further comprises common name information identifying the server entity,
wherein the first entity is further configured to generate a random path and include the random path into the challenge information transmitted to the requesting device, and
wherein the second entity is further configured to issue the digital certificate under condition that the second entity further successfully verifies that:
the cryptographic response to the cryptographic challenge has been published on the server entity identified by the common name information at the random path included in the challenge information; and
the cryptographic response published on the server entity constitutes the valid proof of ownership of the public key.

15. A requesting device for requesting a digital certificate, the requesting device comprising:
a first unit having a hardware processor configured to transmit a challenge request to and receive challenge information comprising a cryptographic challenge from an issuing device;
a second unit having a hardware processor configured to create, using a private key of a cryptographic key pair, a cryptographic response to the cryptographic challenge, the cryptographic response constituting a valid proof of ownership of a public key of the cryptographic key pair;
a third unit having a hardware processor configured to post the created cryptographic response to a ledger of a distributed database such that the posted cryptographic response is associated therein with counterparty identity information of the requesting device;
a fourth unit having a hardware processor configured to create a certification request comprising the public key and ownership information of the public key of the cryptographic key pair, wherein the ownership information comprises the counterparty identity information of the requesting device; and
a fifth unit having a hardware processor configured to transmit the certification request to and receive an issued digital certificate certifying the ownership information of the public key from the issuing device,
wherein the digital certificate provides an owner of the public key administrative privileges to a server entity, and
wherein an attempt to access administrative privileges of the server entity is prevented when a digital footprint of a rogue digital certificate does not match with the digital certificate posted to the ledger of the distributed database.

16. The requesting device of claim 15, wherein the ownership information comprises common name information identifying the server entity and/or network address information of the server entity, the server entity being an entity managed by and/or being a part of the requesting device,
wherein the first unit is further configured to include the ownership information into the challenge request and to obtain a random path from the challenge response, and
wherein the third unit is further configured to publish the created cryptographic response on the server entity at a path identified by the obtained random path.

17. A computing platform comprising:
an issuing device; and
at least one requesting device,
wherein the issuing device comprises:
a first entity having a hardware processor configured to respond to a challenge request received from a requesting device by transmitting challenge information comprising a cryptographic challenge to the requesting device; and
a second entity having a hardware processor configured to respond to a certification request received from the requesting device, the certification request comprising a public key and ownership information of the public key, by issuing a digital certificate certifying the ownership information of the public key,
wherein the ownership information comprises counterparty identity information relating to a ledger of a distributed database, and
wherein the second entity is further configured to issue the digital certificate under condition that the second entity successfully verifies that: a cryptographic response to the cryptographic challenge has been posted to the ledger of the distributed database; the cryptographic response is associated, in the ledger, with the counterparty identity information included in the ownership information of the certification request; and the cryptographic response constitutes a valid proof of ownership of the public key, and
wherein the at least one requesting device comprises:
a first unit having a hardware processor configured to transmit the challenge request to and receive challenge information comprising the cryptographic challenge from the issuing device;
a second unit having a hardware processor configured to create, using a private key of a cryptographic key pair, the cryptographic response to the cryptographic challenge, the cryptographic response constituting the valid proof of ownership of the public key of the cryptographic key pair;
a third unit having a hardware processor configured to post the created cryptographic response to the ledger of the distributed database such that the posted cryptographic response is associated therein with the counterparty identity information of the requesting device;
a fourth unit having a hardware processor configured to create the certification request comprising the public key and the ownership information of the public key of the cryptographic key pair, wherein the ownership information comprises the counterparty identity information of the requesting device; and a fifth unit having a hardware processor configured to transmit the certification request to and receive an issued digital certificate certifying the ownership information of the public key from the issuing device, wherein the digital certificate provides an owner of the public key administrative privileges to a server entity, and wherein an attempt to access administrative privileges of the server entity is prevented when a digital footprint of a rogue digital certificate does not match with the digital certificate posted to the ledger of the distributed database.

18. A method for issuing a digital certificate by an issuing device, the method comprising:

responding, by the issuing device, to a challenge request received from a requesting device by transmitting challenge information comprising a cryptographic challenge to the requesting device;

responding, by the issuing device, to a certification request received from the requesting device, the certification request comprising a public key and ownership information of the public key;

issuing the digital certificate certifying the ownership information of the public key; and providing administrative privileges to a server entity to an owner of the public key having the digital certificate; or preventing access administrative privileges of the server entity when a digital footprint of a rogue digital certificate does not match with the digital certificate posted to a ledger of a distributed database, wherein the ownership information comprises counterparty identity information relating to the ledger of the distributed database, and wherein the digital certificate is issued under condition that the issuing device successfully verifies that:

a cryptographic response to the cryptographic challenge has been posted to the ledger of the distributed database;

the cryptographic response is associated, in the ledger, with the counterparty identity information included in the ownership information of the certification request; and the cryptographic response constitutes a valid proof of ownership of the public key.

19. A method for requesting a digital certificate by a requesting device, the method comprising:

transmitting, by the requesting device, a challenge request to an issuing device;

receiving, by the requesting device, challenge information comprising a cryptographic challenge from the issuing device;

creating, by the requesting device using a private key of a cryptographic key pair, a cryptographic response to the cryptographic challenge, the cryptographic response constituting a valid proof of ownership of a public key of the cryptographic key pair;

posting, by the requesting device, the created cryptographic response to a ledger of a distributed database such that the posted cryptographic response is associated therein with counterparty identity information of the requesting device;

creating a certification request comprising the public key and ownership information of the public key of the cryptographic key pair, wherein the ownership information comprises the counterparty identity information of the requesting device;

transmitting the certification request to the issuing device;

receiving an issued digital certificate certifying the ownership information of the public key from the issuing device; and providing administrative privileges to a server entity to an owner of the public key having the digital certificate; or preventing access administrative privileges of the server entity when a digital footprint of a rogue digital certificate does not match with the digital certificate posted to the ledger of the distributed database.

\* \* \* \* \*